United States Patent

Paulsen, Jr. et al.

[19]

[11] Patent Number: 6,078,917
[45] Date of Patent: Jun. 20, 2000

[54] SYSTEM FOR SEARCHING INTERNET USING AUTOMATIC RELEVANCE FEEDBACK

[75] Inventors: Robert Charles Paulsen, Jr.; Michael John Martino, both of Austin, Tex.

[73] Assignee: International Business Machines Corporation, Armonk, N.Y.

[21] Appl. No.: 08/993,115

[22] Filed: Dec. 18, 1997

[51] Int. Cl.[7] .................................................. G06F 17/30
[52] U.S. Cl. ...................................................... 707/6; 707/5
[58] Field of Search ............................................. 707/5, 6

[56] References Cited

U.S. PATENT DOCUMENTS

| | | | |
|---|---|---|---|
| 5,715,443 | 2/1998 | Yanagihara et al. | 395/603 |
| 5,724,567 | 3/1998 | Rose et al. | 395/602 |
| 5,768,581 | 6/1998 | Cochran | 395/615 |
| 5,826,261 | 10/1998 | Spencer | 707/5 |
| 5,845,278 | 12/1998 | Kirsch et al. | 707/3 |
| 5,855,015 | 12/1998 | Shoham | 707/5 |
| 5,873,107 | 2/1999 | Borovoy et al. | 707/501 |

FOREIGN PATENT DOCUMENTS

WO 95/16956
A1  6/1995  WIPO .
WO 95/23371
A1  8/1995  WIPO .

OTHER PUBLICATIONS

Technical Disclosure Bulletin, v39 N9 Sep. 1996 p 61–62, Utilize Information Accumulated in Gateway, Takishita, N (Japan).

Technical Disclosure Bulletin, v39 N5 May 1996 P91–92, Simple Web Indexing Facility, Deri, L (Switzerland).
Technical Disclosure Bulletin, v38 N5 May 1995, P145–148, Resolver Library Routines, Amra, NK, (Rochester).

Primary Examiner—Wayne Amsbury
Assistant Examiner—Mark Terry
Attorney, Agent, or Firm—Jeffrey S. LaBaw

[57] ABSTRACT

A method of retrieving documents from a document database is disclosed. A set of documents is retrieved according to a first search statement. A signature for a first retrieved document, and preferably other documents by searching for words in the first document and removing common words which occur in a relatively high frequency in a natural language in which the first document is written. The document for which the signature was developed is displayed. Responsive to a user indication that a second search is to be made, deriving a second search statement from the signature of the document.

In the preferred embodiment, a "spectrum" of documents is prepared and presented to the user. The signatures of a plurality of documents from the documents retrieved according to the first search statement by searching for words in the documents and removing common words which occur in a relatively high frequency in a natural language in which the documents are written. The spectrum of documents is selected so that the document signatures differ by at least a predetermined amount. The user may select more than one document to derive further search statement. Responsive to determining that the user has selected a plurality of documents in the spectrum of displayed documents, the second search statement is derived from the signatures of the selected documents.

18 Claims, 7 Drawing Sheets

SYSTEM FOR SEARCHING INTERNET USING AUTOMATIC RELEVANCE FEEDBACK

BACKGROUND OF THE INVENTION

The present invention relates generally to information retrieval in a data processing system. More particularly it relates to an improved interface and method for performing a search of a document database such as the Internet.

It is well known to connect a plurality of computer systems into a network of computer systems. In this way, the collective resources available within the network may be shared among users, thus allowing each connected user to enjoy resources which would not be economically feasible to provide to each user individually. With the growth of the Internet, sharing of computer resources has been brought to a much wider audience; it has become a cultural medium in today's society for both information and entertainment. Government agencies employ Internet sites for a variety of informational purposes. For many companies, their Internet sites are an integral part of their business; they are frequently mentioned in the companies' television, radio and print advertising.

The World Wide Web, or simply "the web", is the Internet's multimedia information retrieval system. It is the most commonly used method of transferring data in the Internet environment. Other methods exist such as the File Transfer Protocol (FTP) and Gopher, but have not achieved the popularity of the Web. Client machines accomplish transactions to Web servers using the Hypertext Transfer Protocol (HTTP), which is a known application protocol providing users access to files, e.g,, text, graphics, images, sound, video, using a standard page description language known as the Hypertext Markup Language (HTML). HTML provides basic document formatting and allows the developer to specify "links" to other servers and files. In the Internet paradigm, a network path to a server is identified by a Uniform Resource Locator (URL) having a special syntax for defining a network connection.

Retrieval of information is generally achieved by the use of an HTML-compatible "browser", e.g., Netscape Navigator, at a client machine. When the user of the browser specifies a link via a URL, the client issues a request to a naming service to map a hostname in the URL to a particular network IP address at which the server is located. The naming service returns a list of one or more IP addresses that can respond to the request. Using one of the IP addresses, the browser establishes a connection to a server. If the server is available, it returns a document or other object formatted according to HTML.

One of the most common, and frequently one of the most disappointing activities performed on the Internet is searching among the plethora of information available at the various web servers for the particular information in which the user is interested. There are a variety of search engines available, including, Alta Vista, Lycos, HotBot aa well as the various search engines attached to the individual web servers themselves.

One of the difficulties is that the formation of a search argument is a difficult task for many users. Boolean arguments, e.g., OR, AND, NOT, AND NOT, are difficult to master. The quality of the search is thus dependent on the skill and vocabulary of the user. Even with such mastery, in many cases, it is difficult to properly anticipate the exact words which will be used by the writers of particular document. The addition of a thesaurus would be helpful, but in many cases the vocabulary is technical or specialized which simply would not be found in a general purpose thesaurus. The result of much of an Internet search could most charitably be called "useless". Other terms, some of which are expletives, are known to the art.

Yet among the useless information, there are generally some pearls. A user upon reading such a document, recognizes its worth to his desires and wishes, typically futilely, that he could have more documents like this. He could manually look at the document and attempt to formulate a new search using new words in the desired document. The new search might be better, or similarly dismal to the first.

It would be preferable to provide a user a convenient means to quickly refine an Internet search with a minimum of manual search formulation and keyboard input. The present invention provides one solution to this problem.

SUMMARY OF THE INVENTION

Therefore, it is an object of the invention to facilitate the formulation and refinement of search queries, particularly in the context of an Internet search.

It is another object of the invention to minimize the mental and manual effort required of the user in performing a search.

It is another object of the invention to present a spectrum of possible choices satisfying a set of initial search criteria to the user.

It is another object of the invention to identify degrees of matching between documents satisfying a search criteria.

It is another object of the invention to interactively present and the search results in an intuitive manner.

These and other objects are accomplished by a method of retrieving documents from a document database. A set of documents is retrieved according to a first search statement. A signature for a first retrieved document, and preferably other documents by searching for words in the first document and removing common words which occur in a relatively high frequency in a natural language in which the first document is written. The document for which the signature was developed is displayed. Responsive to a user indication that a second search is to be made, deriving a second search statement from the signature of the document.

In the preferred embodiment, a "spectrum" of documents is prepared and presented to the user. The signatures of a plurality of documents from the documents retrieved according to the first search statement by searching for words in the documents and removing common words which occur in a relatively high frequency in a natural language in which the documents are written. The spectrum of documents is selected so that the document signatures differ by at least a predetermined amount. The user may select more than one document to derive further search statement. Responsive to determining that the user has selected a plurality of documents in the spectrum of displayed documents, the second search statement is derived from the signatures of the selected documents.

BRIEF DESCRIPTION OF THE DRAWINGS

These objects, features and advantages will be more readily understood with reference to the attached figures and following description.

DETAILED DESCRIPTION OF THE DRAWINGS

The invention may be run on a variety of computers or collection of computers under a number of different operating systems. The computer could be, for example, a handheld computer having wireless connection to the network, a personal computer, a mini computer or a mainframe computer. Generally, the computer is running in a distributed network of other computers. Although the specific choice of computer is limited only by processor speed and disk storage requirements, computers in the IBM PC series of computers could be used in the present invention. One operating system which an IBM personal computer may run is IBM's OS/2 Warp 4.0. In the alternative, the computer system might be in the IBM RISC System/6000 (™) line of computers which run on the AIX (™) operating system.

Figure 1:
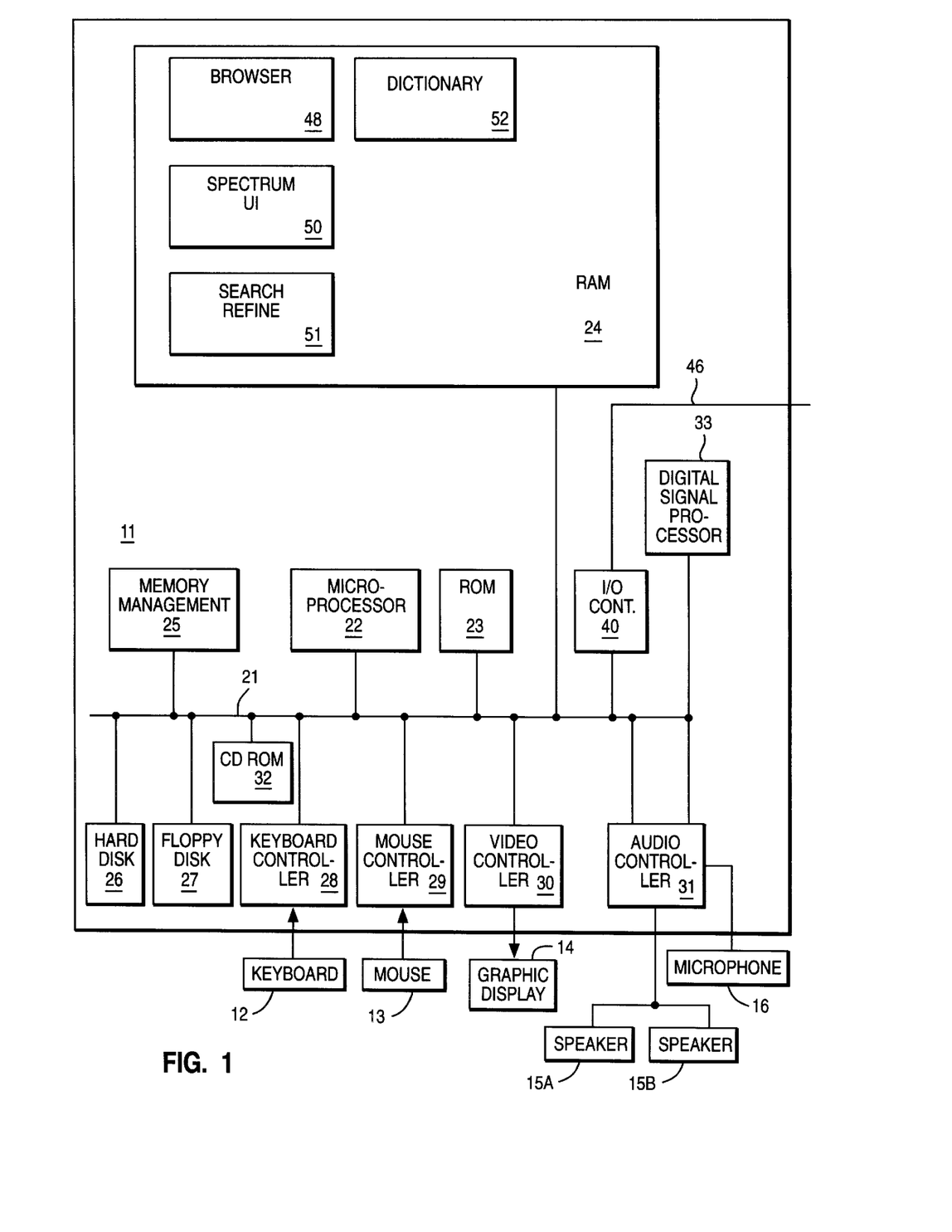
FIG. 1 depicts a computer system configured according to the teachings of the present invention.

In FIG. 1, a computer 10, comprising a system unit 11, a keyboard 12, a mouse 13 and a display 14 are depicted in block diagram form. The system unit 11 includes a system bus or plurality of system buses 21 to which various components are coupled and by which communication between the various components is accomplished. The microprocessor 22 is connected to the system bus 21 and is supported by read only memory (ROM) 23 and random access memory (RAM) 24 also connected to system bus 21. A microprocessor in the IBM PC series of computers is one of the Intel family of microprocessors including the 386, 486 or Pentium microprocessors. However, other microprocessors including, but not limited to, Motorola's family of microprocessors such as the 68000, 68020 or the 68030 microprocessors and various Reduced Instruction Set Computer (RISC) microprocessors such as the PowerPC chip manufactured by IBM. Other RISC chips made by Hewlett Packard, Sun, Motorola and others may be used in the specific computer.

The ROM 23 contains among other code the Basic Input-Output system (BIOS) which controls basic hardware operations such as the interaction of the processor and the disk drives and the keyboard. The RAM 24 is the main memory into which the operating system and application programs are loaded. The memory management chip 25 is connected to the system bus 21 and controls direct memory access operations including, passing data between the RAM 24 and hard disk drive 26 and floppy disk drive 27. The CD ROM 32 also coupled to the system bus 21 is used to store a large amount of data, e.g., a multimedia program or presentation.

Also connected to this system bus 21 are various I/O controllers: The keyboard controller 28, the mouse controller 29, the video controller 30, and the audio controller 31. As might be expected, the keyboard controller 28 provides the hardware interface for the keyboard 12, the mouse controller 29 provides the hardware interface for mouse 13, the video controller 30 is the hardware interface for the display 14, and the audio controller 31 is the hardware interface for the speakers 15. An I/O controller 40 such as a Token Ring Adapter enables communication over a network 46 to other similarly configured data processing systems.

One of the preferred implementations of the invention is as sets of instructions 48–52 resident in the random access memory 24 of one or more computer systems configured generally as described above. Until required by the computer system, the set of instructions may be stored in another computer readable memory, for example, in the hard disk drive 26, or in a removable memory such as an optical disk for eventual use in the CD-ROM 32 or in a floppy disk for eventual use in the floppy disk drive 27. Further, the set of instructions can be stored in the memory of another computer and transmitted in a computer readable medium over a local area network or a wide area network such as the Internet when desired by the user. One skilled in the art would appreciate that the physical storage of the sets of instructions physically changes the medium upon which it is stored electrically, magnetically, or chemically so that the medium carries computer readable information. While it is convenient to describe the invention in terms of instructions, symbols, characters, or the like, the reader should remember that all of these and similar terms should be associated with the appropriate physical elements.

Further, the invention is often described in terms that could be associated with a human operator. While the operations performed may be in response to user input, no action by a human operator is desirable in any of the operations described herein which form part of the present invention; the operations are machine operations processing electrical signals to generate other electrical signals.

Figure 2:
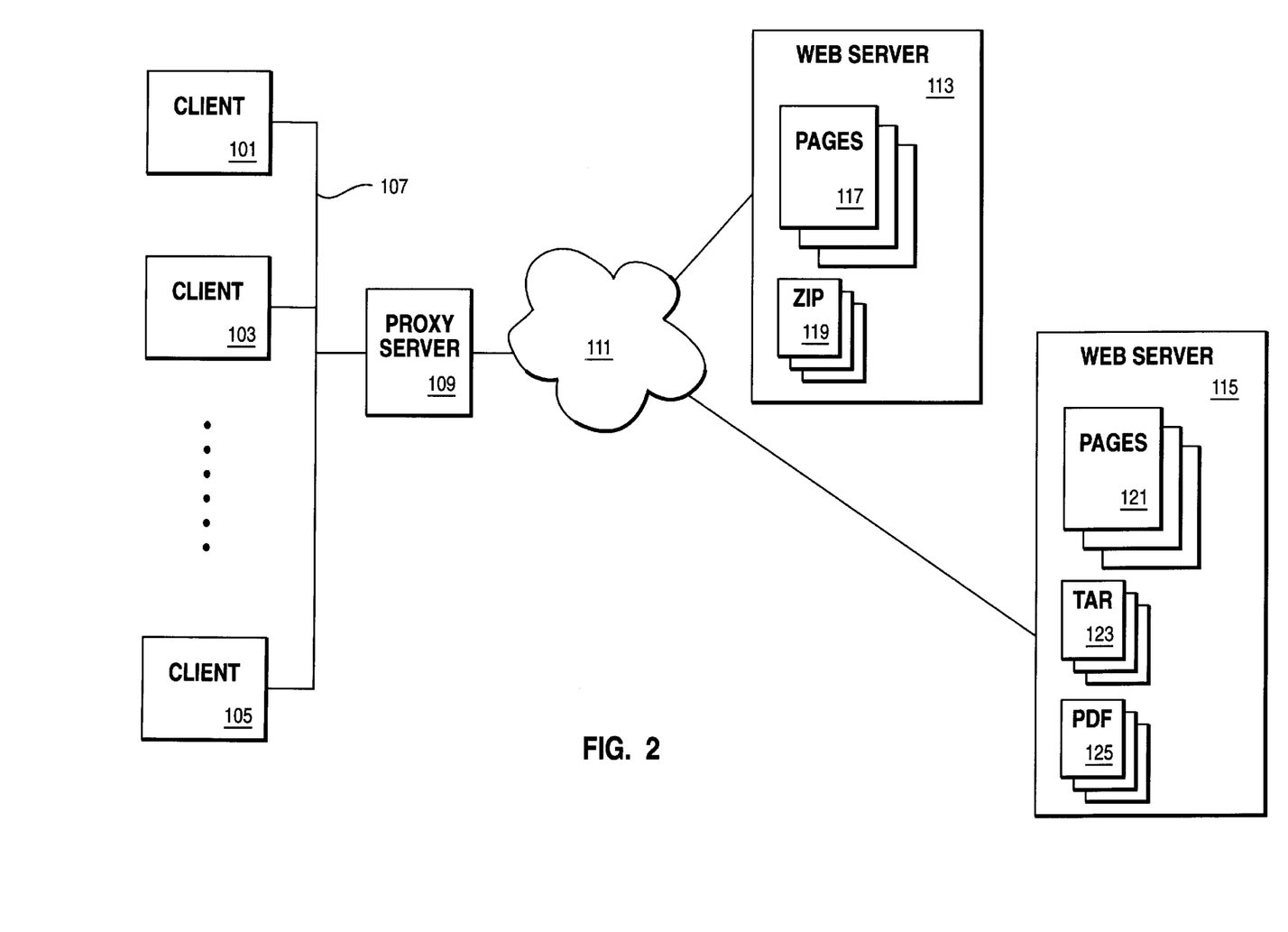
FIG. 2 depicts an Internet environment in which the present invention may be practiced.

In FIG. 2, a simplified version of the Internet is depicted in which the present invention may be practiced. A plurality of clients 101, 103, 105 are coupled by means of a network 107 to a proxy server 109. As is known, the proxy server 109 provides the connection to the Internet 111 for the clients 101–105. Collectively, the clients, network and proxy server can be considered as an intranet. Typically, the proxy server 109 contains firewall software to protect sensitive information on the company intranet from access by the public. A firewall can also be used to limit internal access to material on the Internet which is not deemed acceptable for internal use.

Alternatively, the client computers can be connected to the Internet by means of a server belonging to an Internet Service Provider (ISP). There are many well known therefor nationwide ISPs such as America Online or MCI as well as other locally based ISPs.

A client 101 will make a request in an Internet protocol such as HTTP, FTP or Gopher to one or more Web servers 113, 115 via the proxy server 109 and Internet 111. Those skilled in the art understand that there may be many intermediary servers, routers and gateway machines between the client 101 and the web server 113 which are not pictured. The Web servers 113, 115 store many documents as Web pages 117, 121 in a variety of formats. The problem lies in that many web servers 113, 115 are poorly indexed, or for other reasons return a large proportion of material in which the user is not interested.

One very typical request which a client is apt to make of a web server is to search its storage for a document which covers a particular subject of interest. Typically, this search is done by a keyword search, although other search methods are known to the art. The search argument is difficult to compose, particularly for the novice user.

The invention has three main embodiments although mixtures of each are possible in other implementations. The process of forming new search arguments could be performed at the web server itself. If the invention is not supported by the web server, the process of revising the search could be performed at the proxy server or the search refinement could be performed at the client. Each of the implementations have their own advantages and disadvantages.

It is probably most desirable for the web server to perform the search, and calculate the spectrum of documents because it is usually the most powerful computer system. For a search limited to local files stored on the web server, which would be the most typical case, network delays associated with transmission of files is minimal. Further, once the search is performed, it can be catalogued and made available for other users. However, the creation of the spectrum and association of documents with each member of the spectrum does require greater resources to be devoted to a single client request. It may be impractical, especially for popular sites, to offer such a service.

However, if the web server does not perform the thorough search of the invention, the ability for the proxy server or client to provide the spectrum interface and refine the search arguments will alleviate much user misery. The proxy server in comparison to the client has many of the same advantages as the web server, but on a smaller scale. It is a more powerful machine than the client. The proxy server's search results could be cached, for use by other clients which it services in the intranet, although this is a less likely scenario than for the web server. One disadvantage is also similar that the proxy server is shared among many clients. It may not be feasible to offer this sort of service with an existing machine; upgrading to a more capable machine is expensive. The time to download the files which is required to make the spectrum is also a disadvantage with the proxy server machine. The search can also be performed by another server which is not the proxy/firewall server for the client, but the processes will be very similar to the proxy server case, albeit with slightly longer network transmission time to the client with the results of the search.

The client is the least powerful machine with the longest network access time. However, it offers the most control and is potentially the most thorough of the searches. Since the client is devoted to a single user, it does not have to be concerned with sharing resources which may be bounded in time or disk space with other users. Thus, the search can continue as long as the user wishes (and there remains storage available to the client computer). The user also has greater knowledge of the actual parameters of the search, since he is more directly involved. Once the search is complete, the files are stored at the client ready for use. There are no additional delays waiting for download of the desired files from the list of search results returned by either of the servers.

The "search by example" method of searching used by the present invention provides a means to make the productive use of Internet search engines easier for people who are not skilled, trained or experienced in using the semantics of search arguments. Typically, although the engines provide an easily understood user interface, unless the user is adept in formulating the actual search arguments, much of what is retrieved for any given search is truly worthless.

In reality, the data sought may well be on the Internet, however, the search engines return far too much data that is a poor match for what the user actually intends by any given search argument. One object of this invention is to provide an interactive GUI that will assist the search engine user in finding relevant data as easily as possible. Further, the invention does not demand understanding of how to construct effective Boolean search arguments.

Further, in the proxy server and client embodiments of the invention, even if these operations are not supported at the web server which has all of the indexes and therefor document databases, some if not all of the operations can be performed at the proxy server or client system. As mentioned above, at the client, these operations would be performed by an enhanced browser, or a helper application or plug-in to the browser, preferably implemented in the Java programming language.

As discussed above, the invention relies on the notion of identifying a document which satisfies a given search statement from a spectrum of documents which also satisfy the search statement. The selected document is used to create a second refined search to find other documents similar to the selected document which meets the user's desires. One problem is to identify similarity and dissimilarity of found documents. Another is how to use the identified document to formulate a new search. This invention uses a technique wherein common words of the language in which the document is written are discarded from consideration. The uncommon words which remain are used both to create a spectrum of documents from which the user of the search engine to select a document and also to create a new search based on the selected document from results obtained from earlier search. The means of composing the new search arguments are believed to be novel and will prove to be particularly useful for users of the Internet search engines. The usefulness derives from their enhanced capability to find what is sought without swamping the user with material that is not especially relevant.

This invention provides a search engine user initially with a reduced set of search results that differ from each other. In the web server embodiment of the invention, the comparison of documents to create a spectrum of results is performed at the web server. In the proxy server and client embodiments, i.e. where the invention is not practiced by the web server in question, documents must be retrieved by the proxy server and client. It then allows the user to select from among the responses presented, those items which are most significant to him. Having done this, a subsequent search is made using a revised search argument that has been constructed based on the user's responses to the previous search results. The selection is performed at the client machine using the browser or helper application. The formulation of the new search statement can be made at the client or proxy server, if the search engine at the web server does not support the invention. In the web server embodiment, with the selection of the desired document, a message to the web server is sent where the new search request is formulated. The process can continue, i.e. further searches based on the returned documents until the user is satisfied with the spectrum presented.

Figure 3:
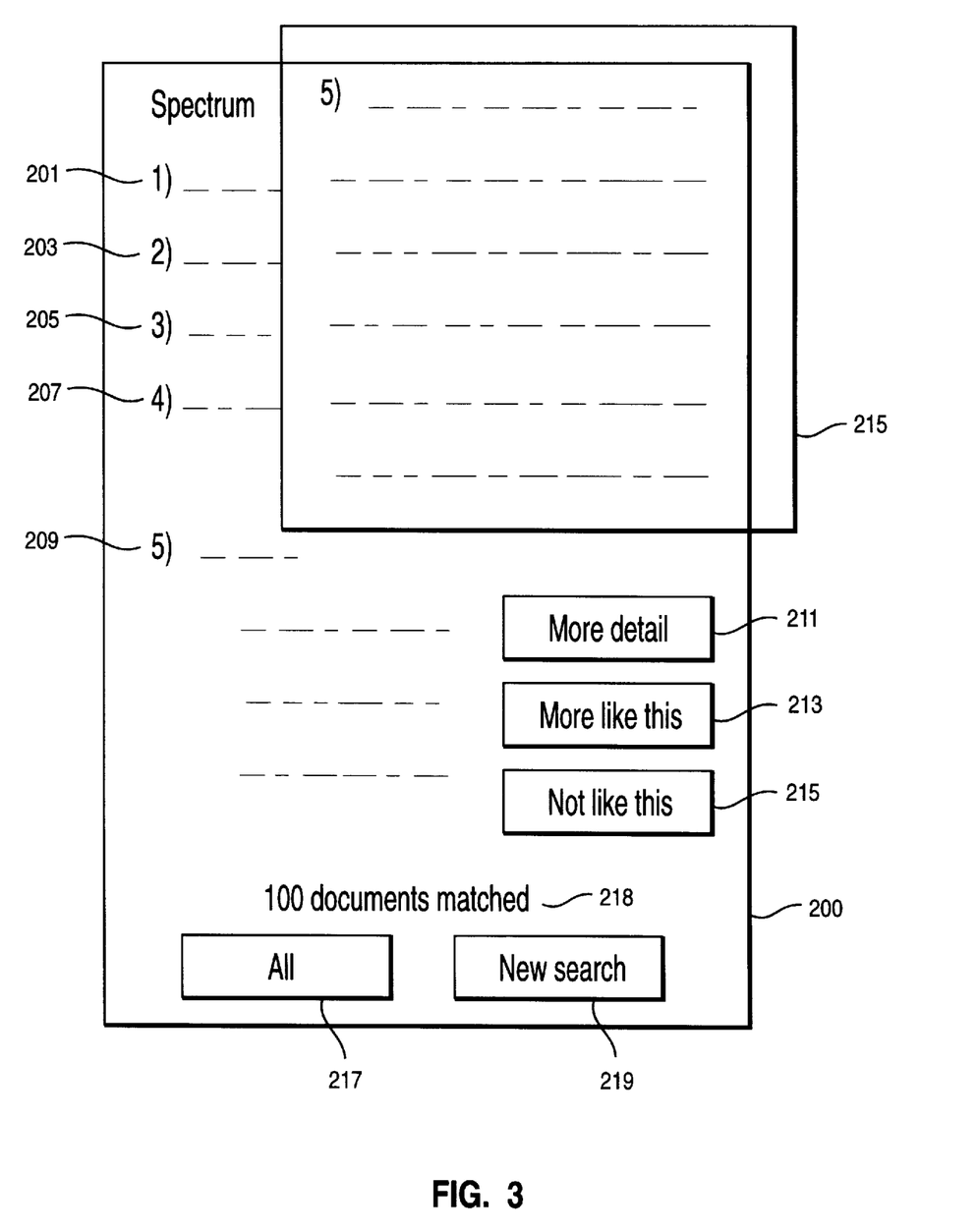
FIG. 3 illustrates an interface by which a user can interact with one or more computer systems which practice the present invention.

A sample user interface is shown in FIG. 3. The invention provides the search engine user with a search result panel 200 wherein a summary of five documents 201, 203, 205, 207 and 209 are shown. The search which caused the display could be as simple as a single word. Thus, no actual knowledge of Boolean operators is required. Push buttons 211, 213 and 215 allow the user to read a more complete version of the document, select the document or indicate that it is not suitable. One skilled in the art would appreciate that some other number of search results are possible. Preferably, all of the documents in the match the initial query. However, they differ from each other by signature, and so it follows they differ from each other in a content sense as well. These documents represent the spectrum of results from the search performed with the user's input search argument. Given this spectrum of responses, the user is asked to indicate which of the responses were closest to the document for which he is searching. The user indicates all, none or some of the responses by selecting the appropriate push buttons. In response to pushing a button 211 for more detail, a panel 215 is presented in which a more complete version of the document is presented. This action may require a new HTTP request to the server for the complete document.

The method uses the indicated responses to create a new search argument and execute a new search, and to return any selected results found from the previous search. That is, when the user chooses the "all" push button 217, it is understood that the displayed spectrum, wide or narrow as it is, includes items the user wants to see, and since the displayed spectrum is derived from the most recent search, that search was satisfactory. Therefore, the search engine allows the user to peruse all of the search results in summary or full form. An indicia 218 of how many documents satisfied the initial search would apprise the user of how many documents he might be ordering with the selections of the "all" button 217. The indicia 218 would change, or a new indicia presented (not shown), when the user selects some of the documents as desirable. Alternatively, a number could shown at the side of each document in the spectrum, indicating how many like documents are associated with the displayed document. If the user is not satisfied, a new search is initiated based on the selected documents upon depression of the new search button 219. Note that the user can indicate that the search engine should not return documents in a subsequent search which are like ones in the spectrum.

The difficulty is deriving the spectrum of results and then, based on the user's selection of items from the spectrum, building the new search argument. The present invention uses a common word filter to accomplish both tasks.

Suppose a user composes a search argument and executes an Internet search that returns 1000 "hits". The invention takes the first hit and builds a word profile of it. That is, for all words in the document except those on a list of the most common words for the language (say the top 50% or so) create a new list of those words which make up the remaining 50% of the document.

For the paragraph immediately above, stripping out the words which occur most frequently the American English (the top 47%) would leave this text:

Suppose user composes search argument executes Internet search returns 1000 hits invention takes hit builds word profile words document except those list most common language (say top 50%) create list those words make remaining 50% document.

hit 1
say 1
top 1
hits 1
list 1
lost 1
make 1
most 1
Takes 1
user 1
word 1
builds 1
those 2
words 2
common 1
create 1
except 1
search 2
profile 1
returns 1
Suppose 1
argument 1
composes 1
document 2
invention 1
remaining 1
executes 1
Internet 1
language 1

While the above list could be alphabetized or placed in some other such as order of occurrence in the document, it is convenient to list them in word length order.

Of the 69 words in the paragraph, 35 or roughly 50% are left. These 35 words are a "signature" of this document. In fact, at the 47-percentile level, these words are the signature of the document.

This definition of the "signature" of a document is believed to be original. Note that the "signature" will vary in a measurable and predictable way as the size of and content of the common word table is increased to be a larger and larger percentage of the words in the language. So it makes sense to speak of the signature of a document at the 0-percentile level, meaning the original document and so on down to a 100-percentile level, meaning there are no words left. This concept is expected to be useful with genre. Examples of different genres of documents include technical writing, fiction, medical and legal documents. Documents of different genres would have different signatures because of the different vocabularies and frequency of use of words within documents of each genre.

Using this signature, the method processes the next document, again stripping out the common words and compare the 50-percentile signature to the first one. If the two signatures are "close," the method discards the second document and continues the process until a document is found that is "not close" to the first one and then save this second document. Now the system has two documents from the same search that have signatures which differ at the 50-percentile level. The system continues to process the remaining documents, comparing their signatures to both of the previously selected ones until a signature is found that is "not close" to either of the first two selected. This document is then added to the results list. It is clear that this process will result in creating a list of signatures of the original documents that differ from each other by the definition of "not close." Since all of the documents whose signatures are compared are initially derived from the same search argument, the list of document signatures is finite. With a good choice of a "not close" definition, the documents in the spectrum will be very limited in number. The documents represented by the signatures then provide the user with the spectrum of results at least some of which the search was intended to identify.

The system then returns to the user the original documents whose signatures caused them to be selected. The user interface is presented to the user, prompting the user to indicate which one, some, all or none of the documents best meet his needs. At the least, the user can indicate which are most interesting, if none exactly meet his needs. If the user selects "all," then the search was a success; the method returns all the documents found to him. The logic is simple; if the entire spectrum was of interest, given the way it was built, the entire set of documents meets his needs.

If the user selects "none," then the method returns a panel to the user to request additional input such as new words from the user. Possibly, a thesaurus could be used to help the user select new words which are like those in the original search argument. If none of the 1000 documents which met the user's search criteria meet his needs, then the search must be corrected and re-issued by the user.

If the user selects "one," then the method returns to him all the documents from the previous search that were "too close" to the selected document to warrant adding them to the spectrum during the spectrum building pass. Alternatively, if the user requests a further search, the method uses the most frequently occurring words in the spectrum document (and associated documents) to compose a new search argument and re-issue the search. When the results are returned from the engine, the method builds a new spectrum and continues.

If the user selects "some" of the documents in the spectrum, first, the method returns the documents from the previous search that were "too close" to any of the selected documents to warrant adding them to the spectrum and second, combine the signatures of the selected documents and choose from the combined signature the common words. The method uses these words to compose a new search argument and re-issue the search. As one skilled in the art will appreciate, there are a multitude of different ways to select from the two or more documents the particular set of words to use as search arguments for the subsequent searches. As the example immediately below shows, the use of words common to the two (or more) documents is one way that will work well. In any given instance, there may well be a better way of combining them.

As an example, please consider the paragraph below with the paragraph used for the above example:

The present invention provides a means to make the effective use of Internet search engines easier for people who are not skilled, trained or experienced in using the semantics (including Boolean expressions) of search argument constructions. Typically, although the engines provide a fairly straightforward GUI, unless one is skilled in providing the actual search arguments, much of what is returned for any given search can only be called useless.

Below are the 47-percentile paragraph signatures with the words common to both paragraphs marked with an asterisk. There are four such words, "make," "search," "argument" and "Internet." Note that these four words certainly represent what this invention is about, i.e. "mak(ing an) Internet search argument".

| Signature of Second Paragraph of PROBLEM Section | Signature of First Paragraph of "AN EXAMPLE" |
|---|---|
| any 1 | hit 1 |
| GUI 1 | say 1 |
| use 1 | top 1 |
| * make 1 | hits 1 |
| given 1 | list 1 |
| means 1 | lost 1 |
| using 1 | * make 1 |
| actual 1 | most 1 |
| called 1 | Take 1 |
| easier 1 | user 1 |
| fairly 1 | word 1 |
| people 1 | build 1 |
| * search 4 | those 2 |
| unless 1 | words 2 |
| Boolean 1 | common 1 |
| engines 2 | create 1 |
| provide 1 | except 1 |
| skilled 2 | * search 2 |
| trained 1 | profile 1 |
| useless 1 | returns 1 |
| although 1 | Suppose 1 |
| * argument 1 | * argument 1 |
| * Internet 1 | composes 1 |
| provides 1 | document 2 |
| returned 1 | executes 1 |
| arguments 1 | * Internet 1 |
| effective 1 | language 1 |
| including 1 | remaining 1 |
| invention 1 | |
| providing 1 | |
| semantics 1 | |
| Typically 1 | |
| experienced 1 | |
| expressions 1 | |
| constructions 1 | |
| straightforward 1 | |

The signatures of the chosen documents can be combined by taking the words common to each of the documents and connecting them in a search argument with an AND connective. Note that there are different ways that the words can be combined; using the AND connective is the most stringent in that it requires that all documents selected have every word in the argument. This will tend to limit the documents selected to those more nearly relevant. However, if required or desired, the user may be asked if he would prefer a broader search in which case the words may be linked using the OR connector. This search argument would provide broader coverage as it requires only that one of the words be present before the document is selected.

For example, using the words common to the two paragraphs above, the two search arguments would be:

AND-case: make & search & argument & Internet

OR-case: make|Internet|search|argument

Another way of using the words that are common to the selected documents for the purpose of re-issuing the search is to automatically include a series of synonyms along with the basic words identified using the method described above. Such a list can be readily made available by using an on-line thesaurus.

In calculating the signature and the degree of closeness, in the preferred embodiment, the application of one or more suffix handling tools is applied to the uncommon words left in the document and the resultant search words. A dictionary of conjugation and plurals can thus be used so that certain suffixes can be replaced by a "wild card" symbol. e.g., "*" or "$", and the search run with these modified search arguments. In the example above, "hit" and "hits" both become "hit*", increasing the importance of the word in the signature of the paragraph and possibly, as described below, the likelihood that it will be used as a search term in a subsequent search.

In addition to the specific method described above for isolating from the selected documents the words to be used in creating a new search argument, every word that was found in one or more of the documents more than once (or some other specified number of times) can be included. In the example above, these words occur twice (and are not otherwise included in the search):

"those," "words," "engines," "skilled," "document."

While these particular methods are described for purposes of illustration, other methods for using the uncommon words discovered by the invention which would be obvious to one skilled in the art given the description above are encompassed by the present invention.

The reader should note that very brief paragraphs are used so that the principles of the invention can be easily understood without resort to long word lists and documents. When the documents are long, the signatures become much more distinctive with the occurrence of particular words becoming more frequent. Thus, although the user will appreciate that the invention is useful even in the short paragraphs, it becomes much more exact with longer documents.

Figure 4:
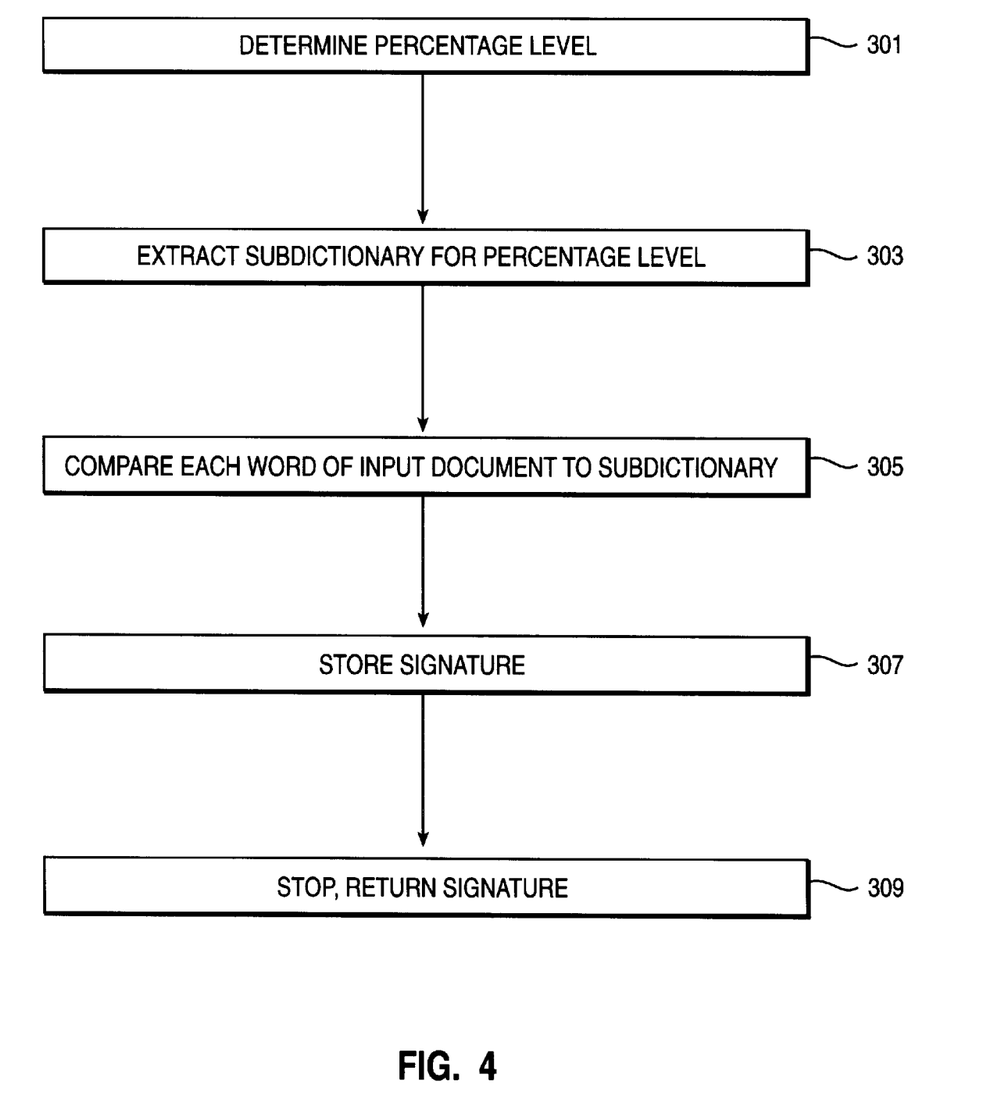
FIG. 4 is a flow diagram for computing a document signature.
Figure 5:
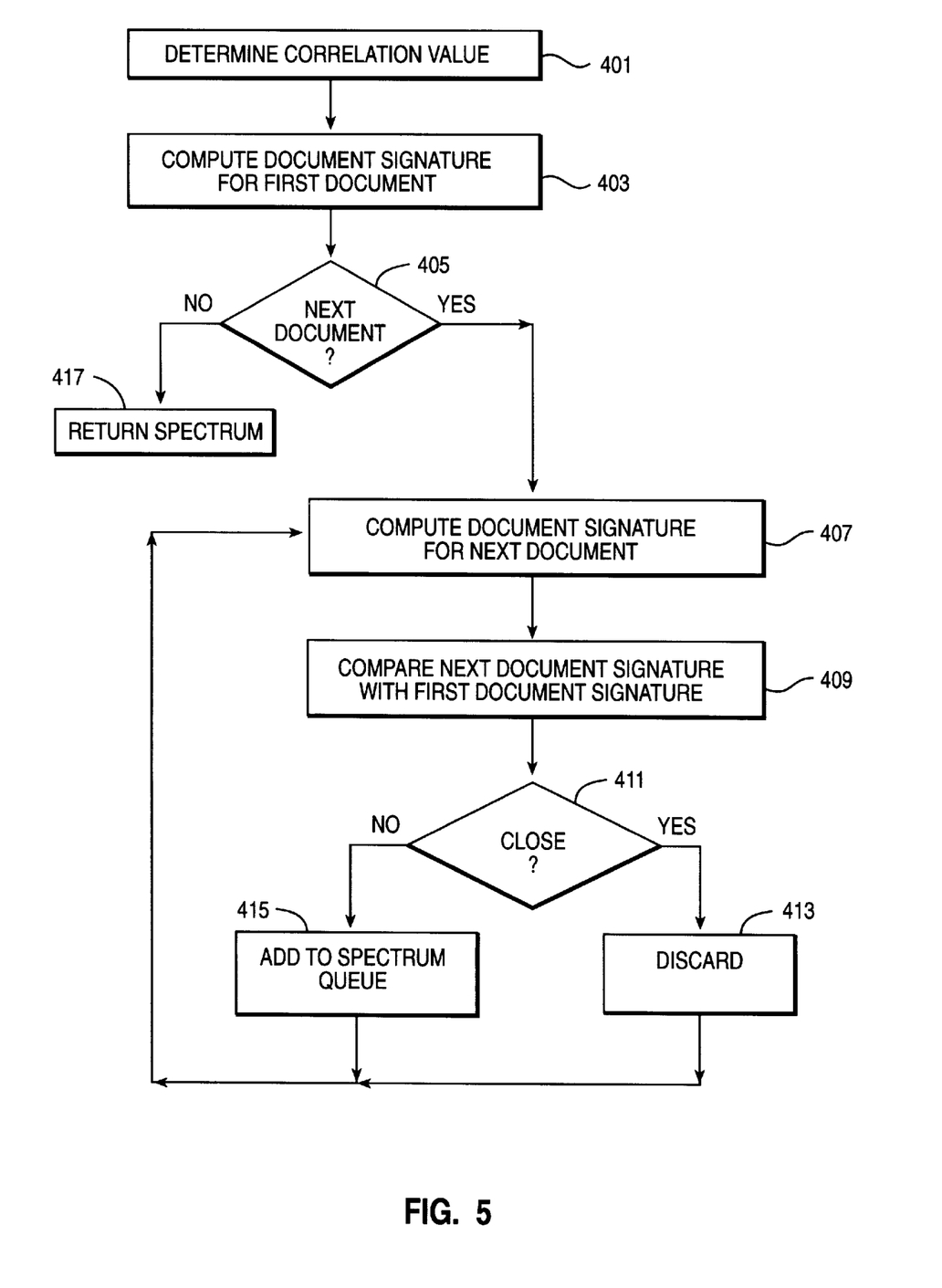
FIG. 5 is a flow diagram for building a spectrum of documents from which a user can select to further refine a search query.
Figure 6:
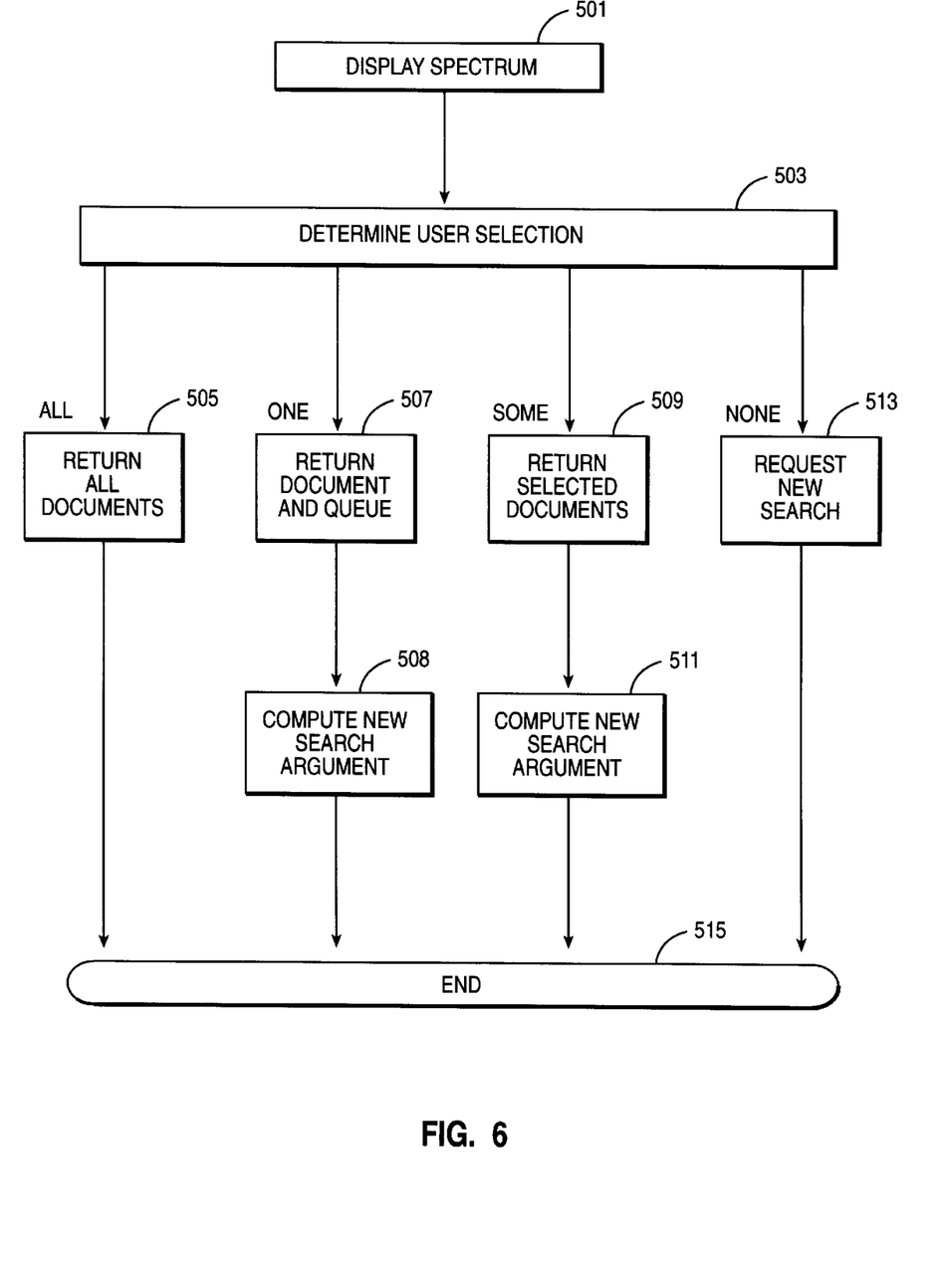
FIG. 6 is a flow diagram for controlling the search through the use of a user interface.
Figure 7:
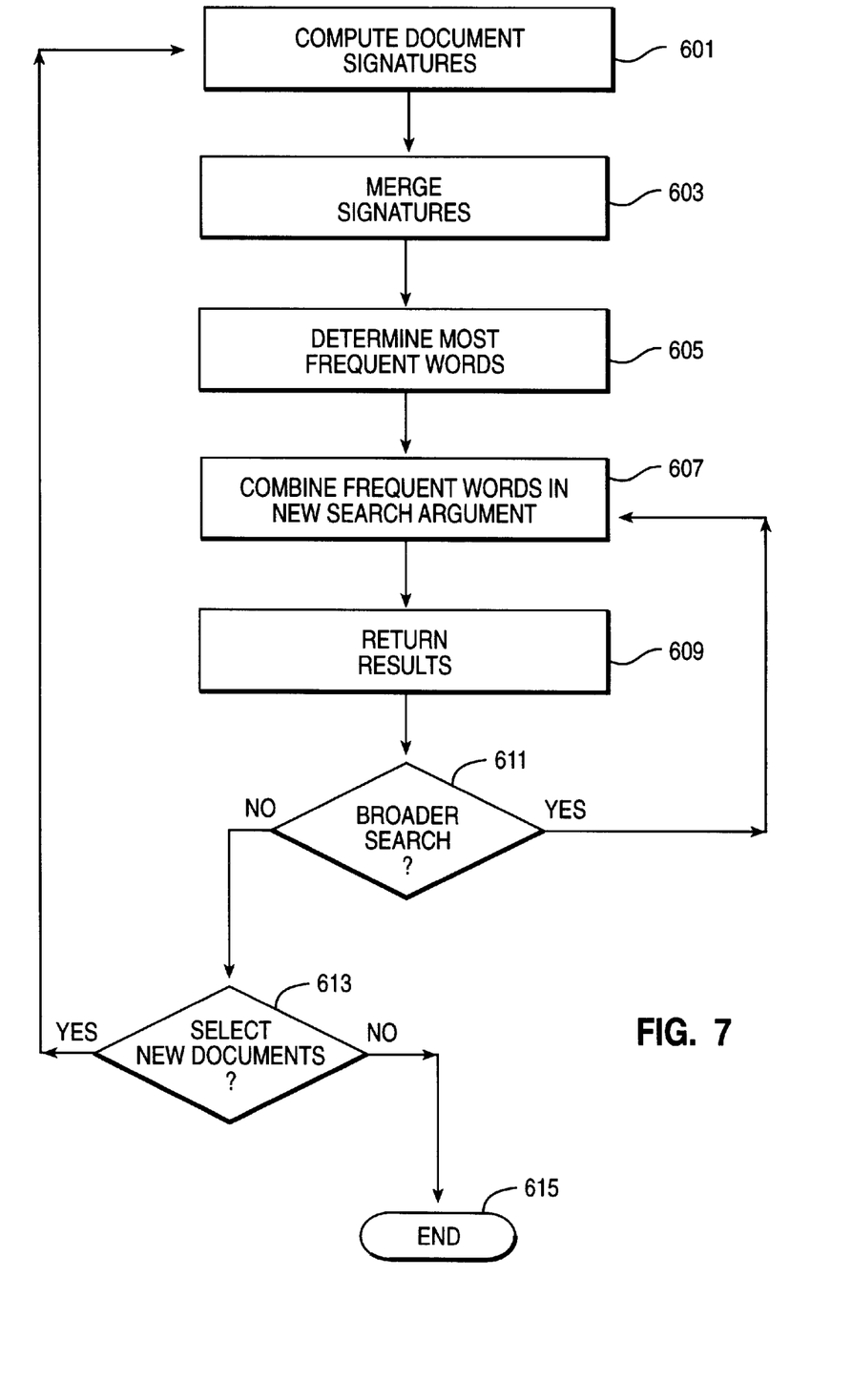
FIG. 7 is a flow diagram for determining a next search statement from user selection of a returned document.

The invention will now be described with greater particularity referring to the flow diagrams in FIGS. 4–7. While particular method steps are illustrated in the diagrams, in this invention the novel elements may be embodied in alternative processes. The flow diagrams below illustrate four methods. The method of computing a document "signature" at a given percentile level (FIG. 4). The method of computing a spectrum of results of results that includes all the returns from the search (FIG. 5). A method of controlling the results returned to the user and determining the flow of processing (FIG. 6). A method of computing a new search argument from several selected documents (FIG. 7).

In the web server embodiment, the construction of the spectrum, calculation of signatures, association of documents with members of the spectrum and refinement of the search based on the user's input are all performed at the server. The user interface is presented and the user input on the desired documents is collected, of course for all embodiments at the client machine. In the proxy server embodiment, the initial search is performed at the web server, whereupon all of the results are sent to the proxy server where the spectrum is constructed, the signatures calculated, documents associated and search refined. The client embodiment is similar, the initial search is performed at the web server, whereupon all of the results are sent to the client where the spectrum is constructed, the signatures calculated, documents associated and search refined. Subsequent searches based on the new search arguments are performed at the web server. Other variations are possible. One variation is that the signatures for selected documents calculated at the web server or the proxy server could be returned to the client where the search refinement takes place.

One preferred method for computing a document signature is depicted in FIG. 4. In step 301, The method determines the percentile level of the document signature required. In the preferred embodiment, this value is to be determined experimentally for each application and set of documents. The web master for a site will know generally what type of documents he has stored. By performing several trial searches, he will be able to obtain a good spectrum of results for a given length and number of documents. Assuming that the length of the documents remain constant, once the initial search results are returned from the search engine, i.e. number of documents which meet the search criteria, an appropriate percentage can be set. The general purpose search engines, as the length of the documents may vary more, may use both the number of documents and the average or median length of the documents as inputs. For an Internet search engine, the default should be set to a high value (85 percentile) and modified downward as needed to assure a spectrum of at least 5 documents. In the proxy server and client embodiments, although as much information is not available about the document length, the sizes of the downloaded files and whether they are compressed or not, is an indication.

In step 303, the method extracts from the master dictionary for the language of the document a sub-dictionary of words in frequency order such that the sum of their individual frequencies of occurrence total the percentile level specified for the document signature in Step 301. The master dictionary is a list of all the words in the language or universe of discourse, i.e. genre, sorted by frequency of occurrence. Associated with each word is its individual frequency of occurrence in the language discourse. Supposing that a percentile of 50% were selected in step 301, enough words from the master document are extracted and placed into the subdictionary so that their aggregate occurrence in the language of question equals 50%. In American English, "the" occurs with a frequency of 6.8989%, so associated with "the" in the language is the value 6.8989. Note that in a different universe of discourse or genre, the values might well be different. However, a web master of a highly technical site may choose to build his own master dictionary by tallying the frequency of occurrence of words in a representative sample of documents on his web site. The process of sampling the universe of discourse and computing the frequencies of occurrence of the words to build the master dictionary may vary slightly from language to language and genre to genre.

In step 305, the method compares each word of the input document to the words of the sub-dictionary created in Step 303. If the document is compressed, decompression may be necessary or some means of parsing compressed documents (not shown). If there is a match, discard the word, otherwise compare the word with the document signature list. If found, the method increments its count by one. If not, the method adds the word to the signature list with a count of one. By using the selected percentile sub-dictionary, the method builds the document signature at that percentile level. Note that the signature of a given document will vary according to the percentile level chosen.

In step 307, the method reaches the end of the document and stores the document signature for future operations such as building a spectrum of documents or returning a set of similar documents. The selected percentile document signature has been created; it is those words with their associated occurrence counts from step 305. In step 309, the method stops, returning the signature to a requesting process, if desired.

In FIG. 5, the method for building a spectrum of search results is depicted. In step 401, the method determines the correlation value to be used for search result comparisons. This value is to be determined experimentally for each application. There is an interrelationship between the percentile level chosen for a document signature. Both can be chosen on the basis of the number of and length of documents retrieved. For a given number and length of the documents, different pairs of correlation values and document signatures can be found. For an Internet search engine, the default should be set to a low value (0.05) and modified upward as needed to assure that a spectrum of at least 5 documents are selected.

In step 403, the method computes and saves the document signature for the first document as described above with reference to FIG. 5. The document is saved by adding it to the spectrum queue. This step and step 401 can be viewed as initialization steps for the overall process which follows.

In step 405, a test is performed to determine whether there are any more documents in the search. As long as there are documents remaining, step 407 retrieves the next document and computes its document signature. Again, this step is performed as described above. This is the top of the loop of the main process loop which is executed to build the spectrum of search results using the document signatures.

In step 409, the method compares the document signature with the set of document signatures for those documents on the spectrum queue. Initially, only the first document will be in the spectrum queue. In step 411, a test decides if the comparison value exceeds the correlation value specified in step 401, this document is similar to one (or more) of the documents already on the queue. If so, the document is discarded, step 413. Preferably, the method associates this document with the document on the spectrum queue that it best matches. If the comparison value is less than or equal to the comparison value in set in step 401, this document is very different from any one which is on the spectrum queue. In step 415, the method adds this document to the spectrum queue. In these steps, the system computes the correlation value for each of the documents returned by the search engine with the one (or more) documents that have been already placed on the list, i.e. spectrum queue. It is desired to build a list of 5 or so documents that are all as different from each other as possible within the set of all those that satisfied the search parameters. If the system identifies one that is "close", i.e. has a high correlation, with one or more of the documents already on the list, the two documents are associated. This builds up lists of documents which are similar to one another. If the document is very different, a new list is started for that document.

The method continues to step 405, until there are no more documents in the search results. Then in step 417, the spectrum of documents is returned and presented to the user.

Optionally, there can be further processing to limit the displayed spectrum to a predetermined number of documents. If there are five or fewer documents on the spectrum queue, display them and ask the user to select whether all, some, one or none is closest to what is desired. If there are more than five documents on the queue but 20 or fewer, combine the queues into five queues by computing the cross-correlation of each of the queue seeds with each other and combining, pair-wise, those with the highest correlations, and then display the 5 final documents. Another alternative is to simply display the first five documents of the spectrum. If the user indicates that he is interested in none of them, then display the next five documents in the spectrum. This may be viewed as preferable to starting a new search with new search terms.

Once the spectrum is assembled the documents can be displayed to the user. The documents comprise a spectrum of all the documents returned by the search. Queued behind each of these documents is one or more of the other documents returned by this search so that the totality of search results are available.

The method to control the flow of processing in the user interface is depicted in FIG. 6. In step 501, the method displays the spectrum preferably in a panel such as a web page formatted according to HTML. In step 503, the method determines the user's choice of ALL, SOME, ONE or NONE of the documents from the spectrum presented. Typically, this is accomplished by detecting a mouse button down event directed to a push button or other control, although other means are known to the art. In step 505, if the user selects ALL, the method then returns all the documents from the current search and goes to step 515.

If the user selects ONE document from the spectrum, the method returns the document and the documents queued from it. Next in step 508, a new search may be requested if the user is not satisfied with the documents already returned. In this step, the method asks the user if he wants to continue the search, sets the number of input documents and computes a new search argument. If the user indicates that he wants more documents, the new search argument is computed from the one document from the spectrum the user has selected along with all the documents that were close to it. The method to compute a new search argument is described below in connection with FIG. 7. Next, the method returns to the search engine with new search argument. If the user is satisfied with the search, the method returns step 515.

If the user selects SOME of the documents, in step 509, the method returns the selected documents and the queued documents associated with the selected documents. In the preferred embodiment, the method asks the user if he wants to continue the search. In step 513, the method sets the number of input documents and computes a new search argument. The method then goes to the search engine with the new search argument. Since the user selected "some" of the documents in the spectrum, after returning the selected documents and those associated documents, a new search argument is built based on the several selected documents and the documents queued off them. One particular method is described below with references to FIG. 7. However, other possibilities exist for using the signatures of the documents to compute a new search argument. If the user is satisfied with the search results, the process ends, step 515.

If the user selects NONE, in step 513 the method discards all documents from the current search and return to the search engine input screen. As mentioned above, where the spectrum is larger than the predetermined number, additional members of the spectrum can be displayed prior to creating a new search. In step 515, all processing is completed.

A method to determine the next search argument is depicted in FIG. 7. In step 601, the method computes the document signatures for each of the documents that were returned to the user. This step may not be necessary in an actual implementation inasmuch as the signatures have been computed already. Simple retrieval will suffice. In any case, at this point the system has a signature, which consists of all the words in each of the documents at the selected percentile level, for each of the input documents.

In step 603, the method merges all of the signatures to form a single master signature. In this step, the words which occur in more than one document are added together. Preferably, related words, e.g., "hit" and "hits" are summed together as "hit*". Thus, the master signature becomes a very good indication of the search terms which should input into the search engine. In step 605, the method uses a clip level to retain only the most frequently occurring words across all the signatures. The clip level may be the five most frequently occurring words or if a word occurs a certain number of times within a certain number and length of documents. Thus, a frequency distribution is built of all the documents queued from the ones in the spectrum that the user selected.

Since the spectrum documents were representative of the queued documents in a very precisely specified way, a more generalized way of performing the next search is needed. This is done by including all the returned documents and building what amounts to a "super signature" of all the selected documents; then the most frequently occurring words are used in that "super document" to build the new search argument. This process is performed in step 607, where the method combines the most frequently occurring words so that each occurs alone and in the inclusive-AND case. This is the new search argument. Alternatively, the new search argument might be ORing the most frequently used words together. Using W1–W5 to indicate 5 different words, the new search argument would look like this:

AND-case: W1 & W2 & W3 & W4 & W5

OR-case: W1|W2|W3|W4|W5

Another way of using the words that are common to the selected documents for the purpose of re-issuing the search is to include a series of synonyms along with the basic words identified using the method described above. Such a list can be readily made available by using an on-line Thesaurus. In the preferred embodiment, the application of one or more suffix handling tools can also be applied to the search words. That is, certain suffixes can be replaced by a "wild card" symbol, e.g., "*" or "$", and the search run with these modified search arguments. In this case, a slight improvement in speed is attained when only the first few letters of the words in the documents are searched for matches.

In addition to the specific method described above for isolating from the selected documents the words to be used in creating a new search argument, every word that was found in one or more of the documents more than once (or some other specified number of times) may be included.

Further, as shown in FIG. 3, the user can indicate which documents he does not like. From these documents and their associated queues, a negative signature can be developed. The negative signature is compared to the master signature. Of the words in the negative signature which do not also occur frequently (or at all) in the master signature, select the most frequent and AND NOT them to the search statement.

In one embodiment of the invention, a set of search statement rules are developed going from most restrictive (ANDing and AND NOTing the negative signature words) to the least restrictive (ORing with synonyms). In this way, the user can get a broader and broader search without rekeying a new search statement.

In step 609, the search results are returned to the user, possibly in spectrum form together with an indication of how many documents satisfied the new search. Step 611 tests whether the user wants a broader search based on the existing documents. If so, the method returns to step 607 and constructs a search argument according to the next search rule. Step 613 tests whether the user wants to refine the search by selecting documents from the returned results. If so, the document signatures will be calculated to provide the input for the next search. If the user is satisfied, the method ends, step 615.

The invention helps the user to find what he wants, by a process of selecting from what he has already found, to retrieve more documents like the ones he wants. The user interface is intuitive and creates new searches with a minimum of expertise on the part of the user. The proxy server and client embodiments of the invention allow the user to create the new searches despite the fact that the search engine at the web server itself does not perform these operations.

While the invention has been shown and described with reference to particular embodiments thereof, it will be understood by those skilled in the art that the invention can be practiced, with modification, in other environments. For example, although the invention described above can be conveniently implemented in a general purpose computer selectively reconfigured or activated by software, those skilled in the art would recognize that the invention could be carried out in hardware, in firmware or in any combination of software, firmware or hardware including a special purpose apparatus specifically designed to perform the described invention. Therefore, changes in form and detail may be made therein without departing from the spirit and scope of the invention as set forth in the accompanying claims.

We claim:

1. A method of retrieving computerized documents from a document database in a computer memory comprising the steps of:

retrieving documents according to a first search statement;

developing signatures for a plurality of documents by searching for words in the documents and removing common words which occur in a relatively high frequency in a natural language in which the documents are written;

automatically associating selected ones of the documents with a first document according to a degree of match of the signatures of the selected documents with the signature of the first document;

displaying the first document;

responsive to a user indication that a second search is to be made, automatically selecting a set of words from an aggregate signature based on the signatures of the first and associated documents and the aggregate number of occurrences of the set of words in the first and associated documents; and constructing a second search statement from the selected set of words.

2. The method as recited in claim 1 further comprising the steps of:

summing the signatures of the first and associated documents to create an aggregate signature;

selecting a set of words from the aggregate signature based on their aggregate number of occurrences in the first and associated documents; and constructing a search statement from the selected set of words.

3. The method as recited in claim 2 wherein the selected set of words are the words with an aggregate number of occurrences are at least as great as a predetermined number.

4. The method as recited in claim 2 wherein the selected set of words are a predetermined number of words having a highest aggregate number of occurrences.

5. The method as recited in claim 2 further comprising the step of selecting a search statement rule for constructing the second search statement.

6. The method as recited in claim 5 wherein a plurality of search rules are available for selection and arrayed in a narrowest to broadest order, and the method further comprises the steps of:

first selecting a narrow search rule for the creation of the second search statement;

creating the second search statement according to the narrow rule and the set of selected words;

retrieving documents according to the second search statement;

upon an indication from the user that a broader search is desired, selecting a broader rule for the creation of a third search statement; and creating the third search statement according to the broader rule and the selected set of words.

7. The method as recited in claim 6 further comprising the steps of:

detecting an indication that one of the documents in the spectrum is unacceptable; and creating the second search statement considering the signature of the unacceptable document.

8. A system including processor, memory and display for retrieving computerized documents from a document database comprising:

means for retrieving documents according to a first search statement;

means for developing signatures for a plurality of documents by searching for words in the documents and removing common words which occur in a relatively high frequency in a natural language in which the documents are written;

means for automatically associating selected ones of the documents with a first document according to a degree of match of the signatures of the selected documents with the signature of the first document;

means for displaying the first document;

means responsive to a user indication that a second search is to be made for automatically selecting a set of words from an aggregate signature based on the signatures of the first and associated documents and the aggregate number of occurrences of the set of words in the first and associated documents; and means for constructing a second search statement from the selected set of words.

9. The system as recited in claim 8 further comprising:

means for summing the signatures of the first and associated documents to create an aggregate signature;

means for selecting a set of words from the aggregate signature based on their aggregate number of occurrences in the first and associated documents; and means for constructing a search statement from the selected set of words.

10. The system as recited in claim 9 wherein the selected set of words are the words with an aggregate number of occurrences are at least as great as a predetermined number.

11. The system as recited in claim 9 wherein the selected set of words are a predetermined number of words having a highest aggregate number of occurrences.

12. The system as recited in claim 9 further comprising means for selecting a search statement rule for constructing the second search statement.

13. The system as recited in claim 12 wherein a plurality of search rules are available for selection and arrayed in a narrowest to broadest order, and the system further comprises:

means for first selecting a narrow search rule for the creation of the second search statement;

means for creating the second search statement according to the narrow rule and the set of selected words;

means for retrieving documents according to the second search statement;

means responsive to an indication from the user that a broader search is desired for selecting a broader rule for the creation of a third search statement; and means for creating the third search statement according to the broader rule and the selected set of words.

14. A computer program product in a computer readable medium for retrieving documents from a document database comprising:

means for retrieving documents according to a first search statement;

means for developing signatures for a plurality of documents by searching for words in the documents and removing common words which occur in a relatively high frequency in a natural language in which the documents are written;

means for associating selected ones of the documents with a first document according to a degree of match of the signatures of the selected documents with the signature of the first document;

means for displaying the first document;

means responsive to a user indication that a second search is to be made for automatically selecting a set of words from an aggregate signature based on the signatures of the first and associated documents and the aggregate number of occurrences of the set of words in the first and associated documents; and means for constructing a second search statement from the selected set of words.

15. The product as recited in claim 14 further comprising:

means for summing the signatures of the first and associated documents to create an aggregate signature;

means for selecting a set of words from the aggregate signature based on their aggregate number of occurrences in the first and associated documents; and means for constructing a search statement from the selected set of words.

16. The product as recited in claim 15 wherein the selected set of words are the words with an aggregate number of occurrences are at least as great as a predetermined number.

17. The product as recited in claim 15 wherein the selected set of words are a predetermined number of words having a highest aggregate number of occurrences.

18. The product as recited in claim 15 further comprising means for selecting a search statement rule for constructing the second search statement.

* * * * *